United States Patent

[11] 3,618,525

[72] Inventor Fred A. Fritz
 Newark, Del.
[21] Appl. No. 790,623
[22] Filed Jan. 13, 1969
[45] Patented Nov. 9, 1971
[73] Assignee Hercules Incorporated
 Wilmington, Del.

[54] ELECTRICAL CIRCUIT FOR CONTROLLING THE TIME DURATION OF CURRENT APPLICATION TO AN EXTERNAL LOAD
5 Claims, 4 Drawing Figs.

[52] U.S. Cl. .................................................. 102/70.2 R,
 102/28 R
[51] Int. Cl. ...................................................... F42c 11/06,
 F42c 11/00, F42c 15/40
[50] Field of Search .......................................... 102/70.2,
 75, 28

[56] References Cited
UNITED STATES PATENTS

| 2,514,434 | 7/1950 | Windes | 102/18 X |
| 2,926,610 | 3/1960 | Ruehlemann | 102/75 X |
| 3,054,352 | 9/1962 | Perdreaux, Jr. et al. | 102/70.2 |
| 3,314,361 | 4/1967 | Olson et al. | 102/70.2 |

FOREIGN PATENTS

| 1,130,745 | 5/1962 | Germany | 102/19.2 |

*Primary Examiner*—Benjamin A. Borchelt
*Assistant Examiner*—Thomas H. Webb
*Attorney*—I. Grant Stewart

ABSTRACT: This is an electrical circuit for time limiting the application of current to an external load. A charging network is fed by alternating current having a capacitor charged through resistance means and a diode when a switching element is positioned conductive between the capacitor and resistance means. A pulsing network is fed by the alternating current which network has a transformer, resistance means, diode and Zener diode providing a pulse to a first silicon controlled rectifier on the half-cycle when the switching element is positioned nonconductive between the capacitor and the resistance means and is positioned conductive between the capacitor and the first rectifier. A second silicon controlled rectifier receives the potential of the capacitor through the first rectifier in its conducting state which in turn allows the second rectifier to conduct and thus permit the capacitor to discharge through said second rectifier to the external load to be controlled. This circuit is particularly adapted to the firing of electrically activated delay blasting caps without arcing when using high voltage.

PATENTED NOV 9 1971   3,618,525

FRED A. FRITZ
INVENTOR.

BY *[signature]*

AGENT

ELECTRICAL CIRCUIT FOR CONTROLLING THE TIME DURATION OF CURRENT APPLICATION TO AN EXTERNAL LOAD

This invention relates to an electrical circuit for time limiting the application of current to a resistive load and more particularly to electrically activated delay blasting caps.

The sequence of events which commonly occur in a delay blasting cap after application of power to the bridge wire is as follows:

The ignition mix is ignited which in turn ignites the delay fuse element, the priming charge and finally the base charge; and After igniting, this ignition mix becomes electrically conductive. Consequently, the continued application of an electric current will generate heat. If this current magnitude and time duration product is sufficient, the heat and pressure generated in this conductive ignition mix can arc through the case. This frequently results in extinguishing the delay fuse which renders the cap inactive with respect to the firing signal. This condition is a misfire. If there is sufficient heat produced to cause burning of the primed explosive charge, the condition is then a hangfire. The hangfire delay is of an unpredictable duration, varying over the range of seconds to minutes, depending on how long it takes the burning explosive to thermally activate the priming charge.

The misfire, if only a small number of caps is involved, is a nuisance necessitating repriming the charge and a refiring. This is time consuming and costly to the operation.

A hangfire can be extremely dangerous if the time delay is sufficiently long. Since there is no satisfactory way of telling how many caps have detonated in a multiple cap round, it must be presumed that when the noise stops all the charges have detonated. If a hangfire condition exists sufficiently long, personnel could be approaching or near the explosive charge when it finally does detonate.

Arcing through the case can also be produced by exploding the bridge wire. This can result in either a hangfire or misfire as just described.

Although misfires or hangfires occur relatively infrequently, their substantially complete elimination represents a primary object of this invention.

Other objects of the invention will appear hereinafter the novel features and combinations being set forth in the appended claims.

Generally described, the present invention contemplates an electrical circuit for controlling the time duration of current application to an external load comprising in combination; a charging network fed by alternating current having a capacitor charged through resistance means and a diode when a switching element is positioned conductive between the capacitor and resistance means; a pulsing network fed by the alternating current having a transformer resistance means, diode and Zener diode providing a pulse to a first silicon controlled rectifier on the half-cycle when the switching element is positioned nonconductive between the capacitor and resistance means and is positioned conductive between the capacitor and the first rectifier; and a second silicon controlled rectifier receiving the potential of the capacitor through the first rectifier in its conducting state which in turn allows the second rectifier to conduct and thus permit the capacitor to discharge through said second rectifier to a load to be controlled.

Representative embodiments of the invention have been chosen for purposes of illustration and description and are shown in the accompanying drawings wherein.

Figure 1:
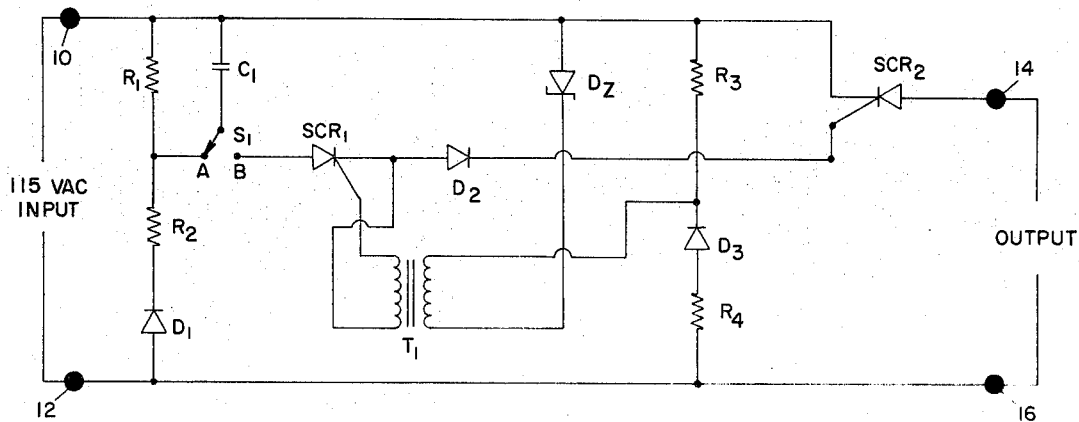
FIG. 1 is a circuit diagram in accordance with the present invention utilizing a 115 volt alternating current input.

Referring now particularly to FIG. 1, the circuit shown is for 110-115 volts alternating current and its operation is as follows.

Power is applied to the input terminals 10 and 12 with switch $S_1$ in position A. Under these conditions capacitor $C_1$ is charged through $D_1$, $R_1$ and $R_2$; $SCR_2$ in its blocking state does not allow current to pass through output terminals 14 and 16 to the output or cap load.

When $S_1$ is moved to position B, $SCR_1$ is now furnished with a short duration current source which it can deliver to the gate of $SCR_2$. $SCR_1$ will discharge capacitor $C_1$ through $D_2$ and the gate of $SCR_2$ when a pulse is generated through $T_1$, $D_3$, $R_3$ and $R_4$. This gate firing pulse occurs the first time the anode lead of $SCR_2$ goes positive after switch $S_1$ is moved to position B from position A. Under these conditions $SCR_2$ conducts allowing current to pass through the output terminals 14 and 16. At the same time $C_1$ is discharged, thus removing the ability of the system to supply additional gate firing pulses to $SCR_2$. Because of the rectifying action of $SCR_2$ conduction occurs only on the half-cycle that the anode of $SCR_2$ is positive and only when its gate receives the signal in the sequence just described.

The pulse generating network consisting of $D_Z$, $D_3$, $T_1$, $R_3$ and $R_4$ will generate only one pulse per cycle. This pulse is produced when the anode of $D_3$ goes positive to the level required to operate the Zener diode, $D_Z$, at its Zener breakover point. This configuration insures that a firing pulse to $SCR_1$ will occur only once and during the early part of each electrical cycle. Thus, $SCR_2$ will conduct early in the cycle with the first pulse received after $S_1$ is moved from position A to position B. Since capacitor $C_1$ is discharged in delivering the gate signal to $SCR_2$ no additional firing of $SCR_2$ can occur until $C_1$ has been recharged.

Figure 4:
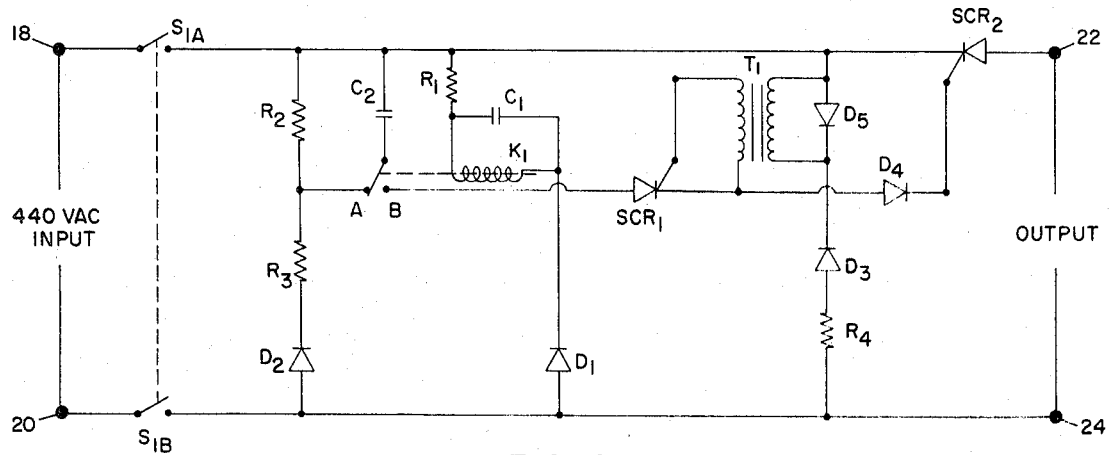
FIG. 4 is a circuit diagram in accordance with the invention utilizing a 440 volt alternating current input.

FIG. 4 shows the circuit diagram modified for operation on 440 volts AC with input terminals 18 and 20 and output terminals 22 and 24. This circuit contains an additional modification, consisting of relay $K_1$, $C_1$, $R_1$, $D_1$ as a replacement for $S_1$ of FIG. 1. This latter modification converts the unit from a switch to a timer. When operated remotely as a timer the function of $S_1$ in FIG. 1 is performed by relay $K_1$. This in turn is operated by the network consisting of $D_1$, $R_1$, $C_1$ and the coil of relay $K_1$.

Components $R_1$, $C_1$ provide a short time delay, adequate to insure that the external activating switch $S_{1A}$ and $S_{1B}$ is fully closed before the relay changes state. Otherwise, $S_1$ if not fully closed would introduce an additional series resistance into the circuit which could be detrimental at the higher cap loads. This particular modification was made to provide the means for operating this firing switch remotely without additional wiring to an external control switch in place of $S_1$ in FIG. 1. This remote operating capability is desirable from both safety and convenience considerations. The safety aspect is obvious; it allows more distance between the blaster and the blast as the switching device is advanced with the face in tunnel work. The necessity for moving the switch as the tunnel face is advanced is a consequence of the requirement of operating the switch into an external resistance of specified limits.

The parts parameters utilized in the circuits of FIGS. 1 and 4 are as follows:

| Figure 1 | | Figure 4 | |
| --- | --- | --- | --- |
| $R_1$ | 5.6K ohms. | $R_1$ | 10K ohms, 10 watts. |
| $R_2$ | 4.7K ohms. | $R_2$, $R_3$ | 50K ohms, 5 watts. |
| $R_3$, $R_4$ | 1K ohms. | $R_4$ | 22K ohms, 12 watts. |
| $D_1$, $D_2$, $D_3$ | 1N2071. | $D_1$, $D_2$, $D_3$, $D_4$, $D_5$ | GE. |
| $D_Z$ | 1N2974 Zener. | | 1N5062. |
| $C_1$ | 1.0µ fd. | $C_1$ | 8µ fd, 450 volts. |
| $SCR_1$ | GE-C106F1. | $C_2$ | 1.0µ fd, 600 volts. |
| $SCR_2$ | 2N686. | $SCR_2$ | GE-C151-P. |
| $T_1$ | Sprague 31Z382 (1:1:1). | $SCR_1$ | 2N4172. |
| $S_1$ | SPDT. | $T_1$ | Chicago Stancor P6465. |
| | | $S_{1A}$ and $S_{1B}$ | DPDT. |
| | | $K_1$ | SPDT Relay KRP11AN coil 10K ohms. |

Figure 2:
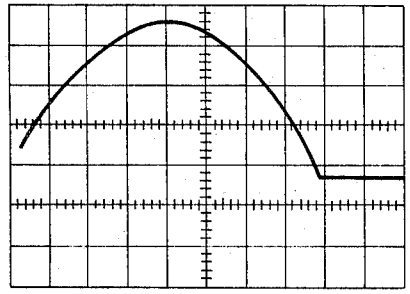
FIG. 2 is an oscilligram of the output of the circuit of FIG. 1 at a 1 ms./cm. sweep.
Figure 3:
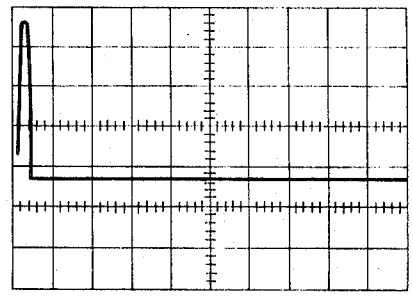
FIG. 3 is an oscilligram of the output of the circuit of FIG. 1 at a 20 ms./cm. sweep.

The circuit shown in FIG. 1 was tested in the laboratory to determine if only a single half sine pulse was produced. During repeated tests only a single pulse was observed on the oscilloscope. FIGS. 2 and 3 show oscillograms of the output at 2 different sweeps, FIG. 2 at 1 ms./cm. sweep shows the entire ½-cycle output, FIG. 3 at 20 ms./cm. sweep shows the single output pulse and the absence of multiple pulses.

Actual cap firings were conducted to determine the overall performance of the system. From these tests it was concluded that a single cap could be fired without arcing if the external series resistance was about 2.0 ohms or more. With this same series resistance 175 caps could be shot in straight parallel or 200 caps could be shot in a reverse parallel hookup.

It was found that if the time-duration of application of current were limited to about 6±1 milliseconds, cap arcing was drastically reduced. On theoretical grounds it was visualized that some additional advantage might be gained by energizing the bridge wire with the relatively slow sinusoidally increasing current flow available from an appropriate 60 Hz. source rather than the extremely abrupt current increase available from direct current sources. An additional factor for consideration was that the cap loads in practice are almost always detonated with 60 Hz. alternating current and often at the 440-volt level. The circuits disclosed herein which are capable of delivering to the cap load a single ½-cycle current pulse of the 60 Hz. AC power line were found eminently suitable as an initiating device for delay electric blasting caps. Thus, it was obvious established that time limiting the application of current to the cap load through an external series resistance of about 2.0 ohms reliably fired, without arcing, either a single cap or 200 caps in a reverse parallel hookup.

Obviously, modifications and variations of the present invention are possible in light of the above teachings. It is, therefore, to be understood that within the scope of the appended claims the invention may be practiced otherwise than as specifically described.

What I claim and desire to protect by Letters Patent is:

1. An electrical circuit for controlling the time duration of current application to an external load comprising in combination:

a. a charging network fed by a source of alternating current said charging network comprising input terminals, a capacitor, resistance means, a diode and a switching element, said capacitor being charged through the resistance means and diode when the switching element is positioned conductive between the capacitor and resistance means;

b. a pulsating network fed by the alternating current, said pulsating network comprising a transformer, resistance means, diode, Zener diode and a first silicon controlled rectifier, said pulsing network providing a pulse to the first silicon controlled rectifier on the half-cycle when the switching element is positioned nonconductive between the capacitor and resistance means of the charging network and is positioned conductive between the capacitor and the first silicon controlled rectifier in the pulsing network; and c. a second silicon controlled rectifier receiving the potential of the capacitor through the first silicon controlled rectifier in its conducting state which in turn allows the second silicon controlled rectifier to conduct and thus permit the capacitor to discharge through said second silicon controlled rectifier to the external load to be controlled.

2. The circuit of claim 1 in which the external load comprises at least one delay blasting cap.

3. The combination of claim 2 in which the time constants of the circuit provide a time-duration application of current to the delay blasting cap which is from about 5 to about 7 milliseconds.

4. The circuit of claim 1 in which a timer means is connected across the input terminals.

5. The circuit of claim 4 in which the external load comprises at least one delay blasting cap and the time constants of the circuit provide a time-duration application of current to the delay blasting cap which is from about 5 to about 7 milliseconds.

* * * * *